June 26, 1962     E. PLANITZER     3,040,879
CONTAINER CONSISTING OF FOAM MATERIAL
Filed Jan. 26, 1960
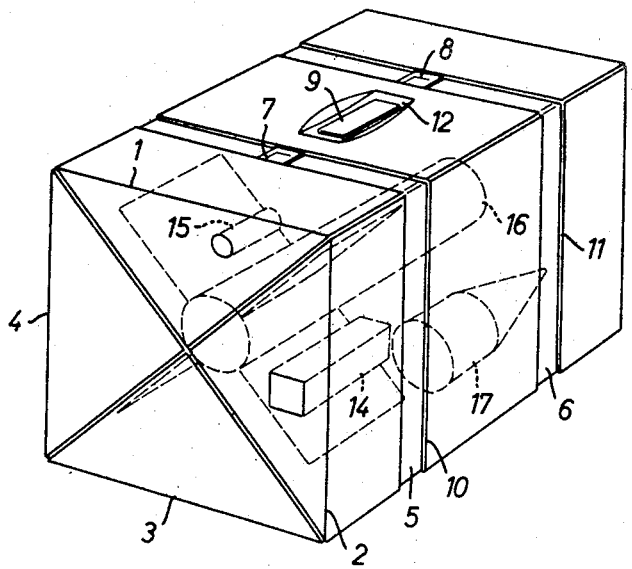
INVENTOR:
ERICH PLANITZER
BY
ATTORNEY United States Patent Office 3,040,879
Patented June 26, 1962

1

3,040,879
CONTAINER CONSISTING OF FOAM MATERIAL
Erich Planitzer, Nuertingen, Germany, assignor to Bolkow-Entwicklungen KG, Ottobrun, near Munich, Germany, a corporation of Germany
Filed Jan. 26, 1960, Ser. No. 4,649
Claims priority, application Germany Feb. 10, 1959
8 Claims. (Cl. 206—46)

This invention relates to a container consisting of several parts of foam material.

One of the objects of the invention is to provide such a multi-part container for the packing of highly valuable and shock-sensitive apparatus.

It is known to manufacture such containers in such a manner that, for example, particles made of synthetic material on a polystyrol basis are dispensed into a form adapted to the object to be packed. This form is then heated to about 120° C. whereby the particles contained in the form are expanding and, while being baked together, fill out the hollow spaces of the form. After cooling, the container, consisting usually of two parts, is ready for use.

In this way, container parts can be realized which fully enclose objects having even complicated external contours.

It has been found difficult, however, to find a container form fulfilling all requirements, which can be easily stacked, and especially for objects which have to be quickly unpacked, with complex external contours and parts which require, during storage, frequent examination.

It is, therefore, another object of the invention to provide a container which is stackable, easily portable and readily demountable.

A further object of the invention is to provide a container consisting of foam material and of several, preferably four, prismatic parts having inner surfaces adapted to the contours of the object or objects to be packed, and outer surfaces having non-communicating recesses adapted to the contours of the banding and the contours of one or several supporting handles; these prismatic parts, after being mounted together and after closing of certain easily accessible parts leading to the outside and serving as openings or pockets, form a rectangular parallelepiped with planar outer surfaces and which is held together by the banding attached in the grooves provided therefor.

These and other objects of the invention will be more fully apparent from the single drawing annexed herewith and showing in perspective view a container assembly embodying certain features of the invention.

In the drawing, the container is shown to consists of four prismatic parts, 1, 2, 3, and 4, composing substantially a quadrangular parallelepiped which is held together by bandings 5 and 6. Bandings 5, 6 are secured by locks 7, 8, respectively. Handle 9 serves to carry the container. Handle 9 and bandings 5 and 6 are arranged within recesses or grooves 10, 11, 12 provided within the outer surface of the individual prismatic parts 1 through 4. After assembly, pockets 14, 15 are accessible from the outside and are closed by stoppers, plates or the like closure elements which can be readily removed, for example by removing a gummed tape attached over it. The remaining outer surfaces of prismatic parts 1 to 4 have recesses 16 and 17 which are so arranged, for example in the manner shown in the drawing, that the object or objects to be packed, for example a flying body, is enclosed from all sides. Pocket 14, for example, serves

2 to store a battery which requires frequent examination and which is connected to the flying body before it is started. Pocket 15 serves to store other parts which are to be examined or adjusted.

Prismatic parts 1 to 4, in accordance with the invention, form in assembly a parallelepiped having planar outer surfaces, i.e., substantially no recesses, and which can be readily stacked and simply carried.

By means of a suitable surface treatment the parallelepiped can be protected against water, acids, or the like. The gaps separating parts 1 to 4 can also be tightened, for example by a special putty, if necessary.

The container is disassembled by opening locks 7 and 8 and removing bandings 5 and 6. Disassembly resembles the peeling of an orange so that the contents of container are immediately accessible without any risk of damage.

The invention is not limited to the specific shape or material of the container nor to the parts shown and described, but may be applied in any form or manner without departing from the scope of this disclosure.

I claim:
1. In combination, a substantially cylindrical body having diametrical wings attached thereto, and a container closely surrounding said body comprising several prismatic parts consisting of polystyrol foam material; said parts forming with their outer surfaces a substantially quadrangular parallelepiped separable substantially along diagonals of said parallelepiped; said diagonals substantially coinciding with the position of said diametrical wings; and said prismatic parts having inner surfaces molded closely following the contours of said body; at least some of said outer surfaces having recesses forming at least one peripheral groove continuously surrounding said parallelepiped, and means provided in said groove for holding said parts together.

2. Container according to claim 1 comprising recesses forming two grooves not communicating with each other.

3. Container according to claim 1 comprising two parallel grooves spaced from each other.

4. Container according to claim 1 wherein said parts consist of at least three prisms fitting against each other substantially along diagonals of said parallelepiped.

5. Container according to claim 1 wherein said parts consist of four prisms fitting against each other substantially along diagonals of said parallelepiped.

6. Container according to claim 1 comprising an additional recess in at least one of said outer surfaces and means for supporting a handle in said other recess.

7. Container according to claim 6 comprising two parallel grooves spaced from each other and wherein said other recess is arranged in the space between said parallel grooves and extends in the direction substantially perpendicular to the longitudinal extension of said grooves.

8. Container according to claim 1 wherein said outer surfaces are additionally treated to increase resistance.

References Cited in the file of this patent
UNITED STATES PATENTS

| 1,380,066 | Johnson | May 31, 1921 |
| 1,983,322 | Stewart | Dec. 4, 1934 |
| 2,780,350 | Simon | Feb. 5, 1957 |
| 2,860,768 | Smithers | Nov. 18, 1958 |

OTHER REFERENCES
Publication, Modern Packaging, November 1956, page 115, Styrene Foam Package for Fostoria Figurine.